US 8,751,311 B2

United States Patent
Liu

(10) Patent No.: US 8,751,311 B2
(45) Date of Patent: Jun. 10, 2014

(54) NAVIGATION SYSTEM WITH LOCATION-BASED SUPPLEMENTAL INCENTIVE NOTIFICATION MECHANISM AND METHOD OF OPERATION THEREOF

(75) Inventor: Xiang Liu, Beijing (CN)

(73) Assignee: Telenav, Inc., Sunnyvale, CA (US)

( * ) Notice: Subject to any disclaimer, the term of this patent is extended or adjusted under 35 U.S.C. 154(b) by 318 days.

(21) Appl. No.: 13/109,350

(22) Filed: May 17, 2011

(65) Prior Publication Data

US 2012/0296565 A1 Nov. 22, 2012

(51) Int. Cl.
 *G06Q 30/00* (2012.01)
 *G06Q 30/02* (2012.01)
(52) U.S. Cl.
 CPC ........ *G06Q 30/0261* (2013.01); *G06Q 30/0224* (2013.01); *G06Q 30/0267* (2013.01); *G06Q 30/0251* (2013.01); *G06Q 30/0241* (2013.01); *G06Q 30/0207* (2013.01)
 USPC .................. 705/14.58; 705/14.57; 705/14.25; 705/14.49; 705/14.4; 705/14.1
(58) Field of Classification Search
 CPC ...................... G06Q 30/02671; G06Q 30/0224
 USPC .......................................... 705/14.25, 14.578
 See application file for complete search history.

(56) References Cited

U.S. PATENT DOCUMENTS

| | | | |
|---|---|---|---|
| 6,061,660 A | 5/2000 | Eggleston et al. | |
| 6,332,126 B1 | 12/2001 | Peirce et al. | |
| 7,149,710 B1 * | 12/2006 | Edmark | 705/26.8 |
| 7,284,066 B1 | 10/2007 | Philyaw et al. | |
| 7,287,007 B1 * | 10/2007 | Detering | 705/37 |
| 7,343,317 B2 | 3/2008 | Jokinen et al. | |
| 7,475,813 B2 | 1/2009 | Swanson, Sr. | |
| 2002/0022995 A1 | 2/2002 | Miller et al. | |
| 2003/0120548 A1 | 6/2003 | Azhimov | |
| 2003/0135398 A1 * | 7/2003 | Groz | 705/7 |
| 2004/0204846 A1 * | 10/2004 | Yano et al. | 701/210 |
| 2005/0289006 A1 | 12/2005 | Cividini et al. | |
| 2006/0212355 A1 * | 9/2006 | Teague et al. | 705/14 |
| 2007/0038516 A1 | 2/2007 | Apple et al. | |

* cited by examiner

*Primary Examiner* — John G Weiss
*Assistant Examiner* — Scott C Anderson
(74) *Attorney, Agent, or Firm* — IP Investment Law Group

(57) ABSTRACT

A method of operation of a navigation system includes: generating a notification of an initial offer; identifying a consumer's vacillation to the initial offer; and generating a second notification of the supplemental incentive offer based on the consumer's vacillation for displaying on a device.

18 Claims, 8 Drawing Sheets

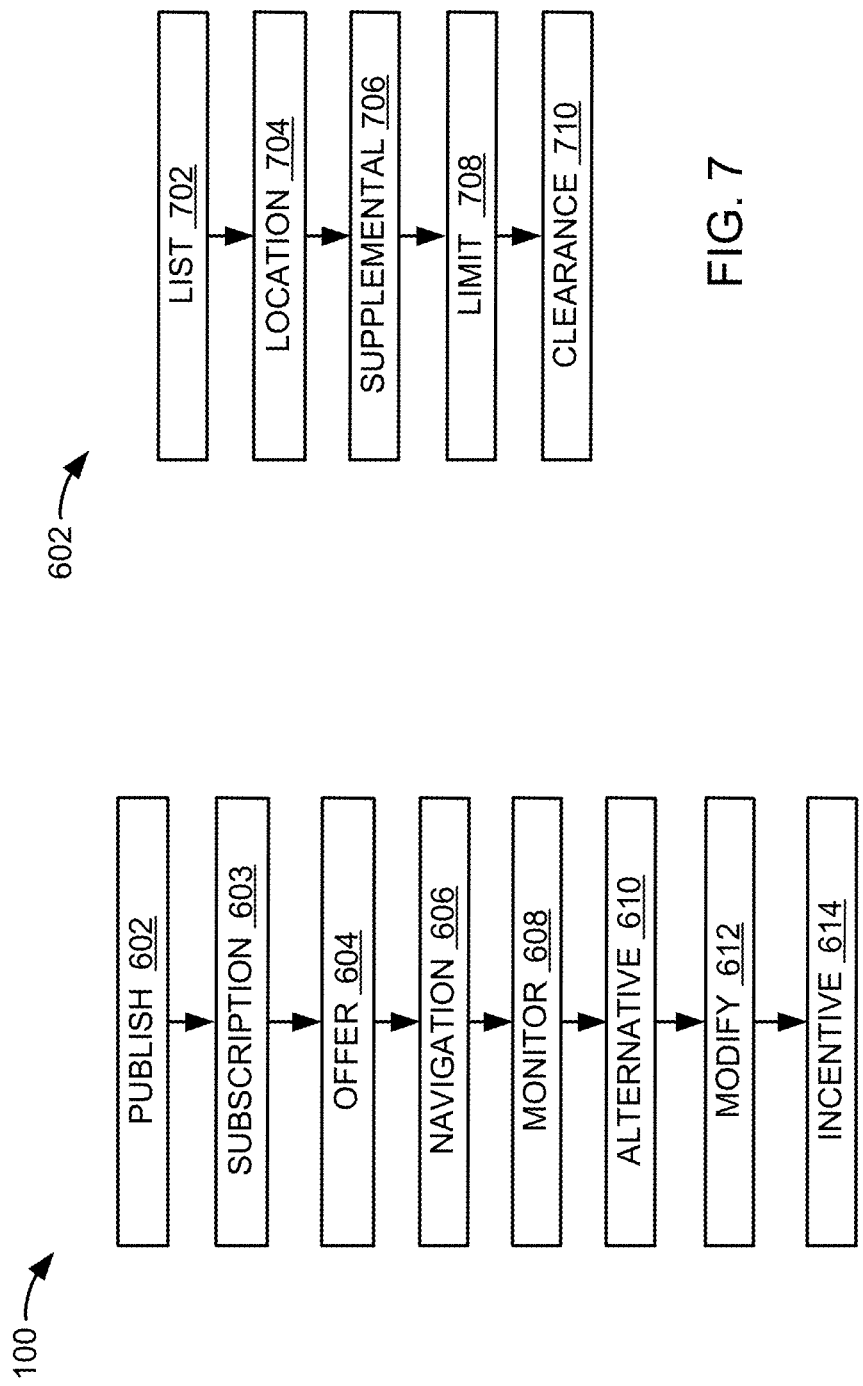

NAVIGATION SYSTEM WITH LOCATION-BASED SUPPLEMENTAL INCENTIVE NOTIFICATION MECHANISM AND METHOD OF OPERATION THEREOF

TECHNICAL FIELD

The present invention relates generally to a navigation system and more particularly to a system for navigation with location-based supplemental incentive notification mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Numerous technologies have been developed to utilize this new functionality.

As users become more empowered with the growth of mobile location based service devices, new and old paradigms begin to take advantage of this new device space. There are many technological solutions to take advantage of this new device location opportunity. One existing approach is to use location information to provide gaming and navigation services such as a global positioning system (GPS) for a car or on a mobile device such as a cell phone or a personal digital assistant (PDA).

Location based services allow users to create, transfer, store, and/or consume information that affects the "real world". One such use of location-based services is to provide notifications to consumers about items for sale.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information, when available or in service areas.

In response to consumer demand, navigation systems are providing ever-increasing functionality. However, current navigations systems still lack features that assist sellers in providing highly relevant messages for the purchases of goods and services. Current navigation systems also lack features that assist consumers in making trips for bargain hunting and purchasing necessities.

Thus, a need still remains for a navigation system having location-based supplemental incentive notification mechanism providing low cost, improved functionality, and improved reliability. In view of the ever-increasing need to save costs and improve efficiencies, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating a notification of an initial offer; identifying a consumer's vacillation to the initial offer; and generating a second notification of a supplemental incentive offer based on the consumer's vacillation for displaying on a device.

The present invention provides a navigation system, including: an offer module for generating a notification of an initial offer; a monitor module, coupled to the offer module, for identifying a consumer's vacillation to the initial offer; and an incentive module, coupled to the monitor module, for generating a second notification of a supplemental incentive offer based on the consumer's vacillation for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

FIG. 6 is a control flow of the navigation system.

FIG. 7 is a control flow of the publish module.

BEST MODE FOR CARRYING OUT THE INVENTION

Figure 1:
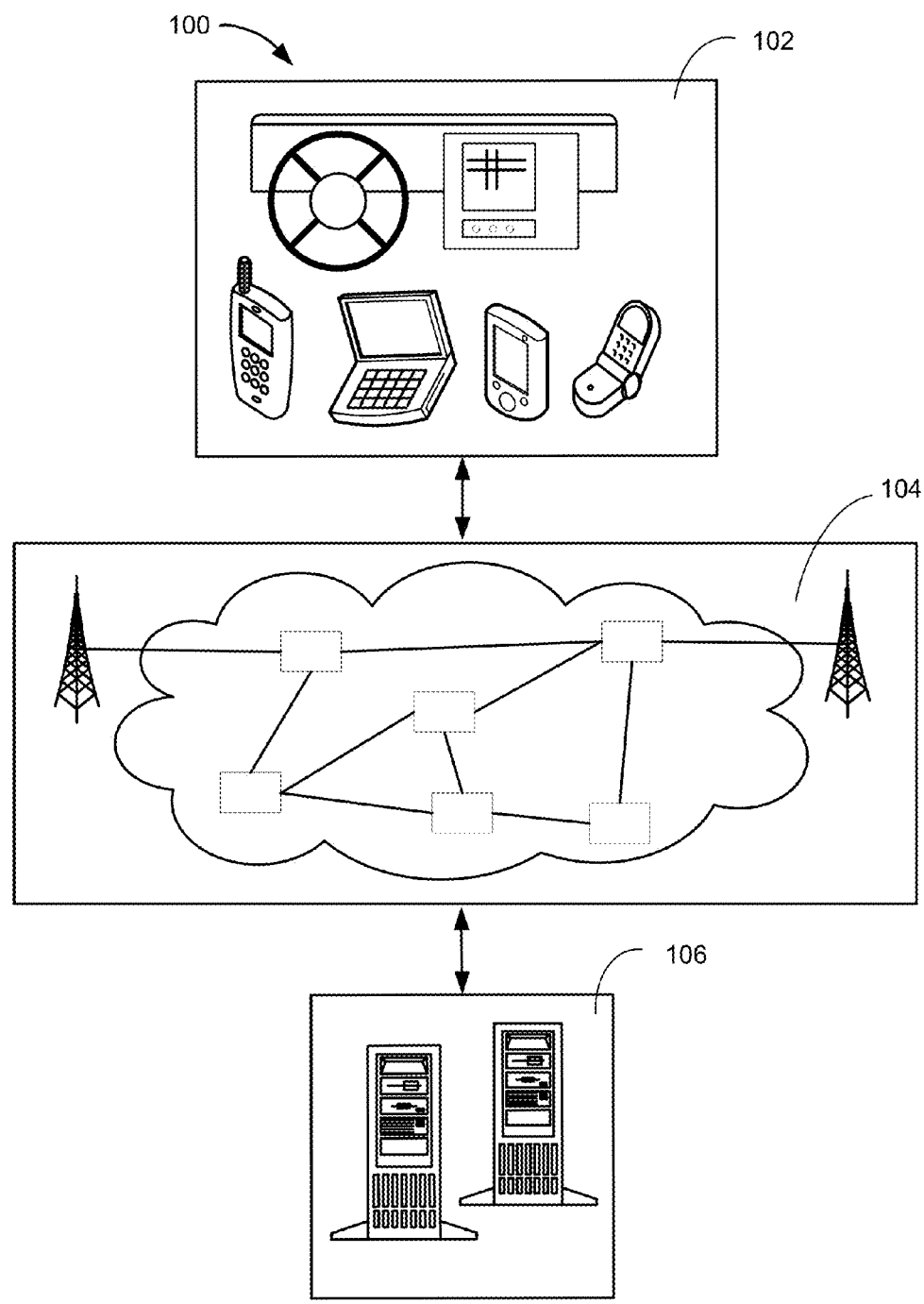
FIG. 1 is a navigation system having location-based supplemental incentive notification mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "publisher" referred to herein can include a person using the navigation system to list products for sale, special offers, bargains, coupons, or a combination thereof. The term "seller" referred to herein can include people selling goods or services. For example, a seller can be a store or company owner, manager, or employee. The term "consumer" referred to herein can include people using the navigation system to find goods and services to buy or purchase.

The term "geofence" referred to herein can include a virtual perimeter for a real-world geographic area with a predefined set of boundaries. A geofence can be dynamically generated as a radius around a store or a point location. Location-aware devices can enter and exit a geo-fence and a notification can be generated regarding the entry and exit.

Referring now to FIG. 1, therein is shown a navigation system 100 having location-based supplemental incentive notification mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telemetric navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid-computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
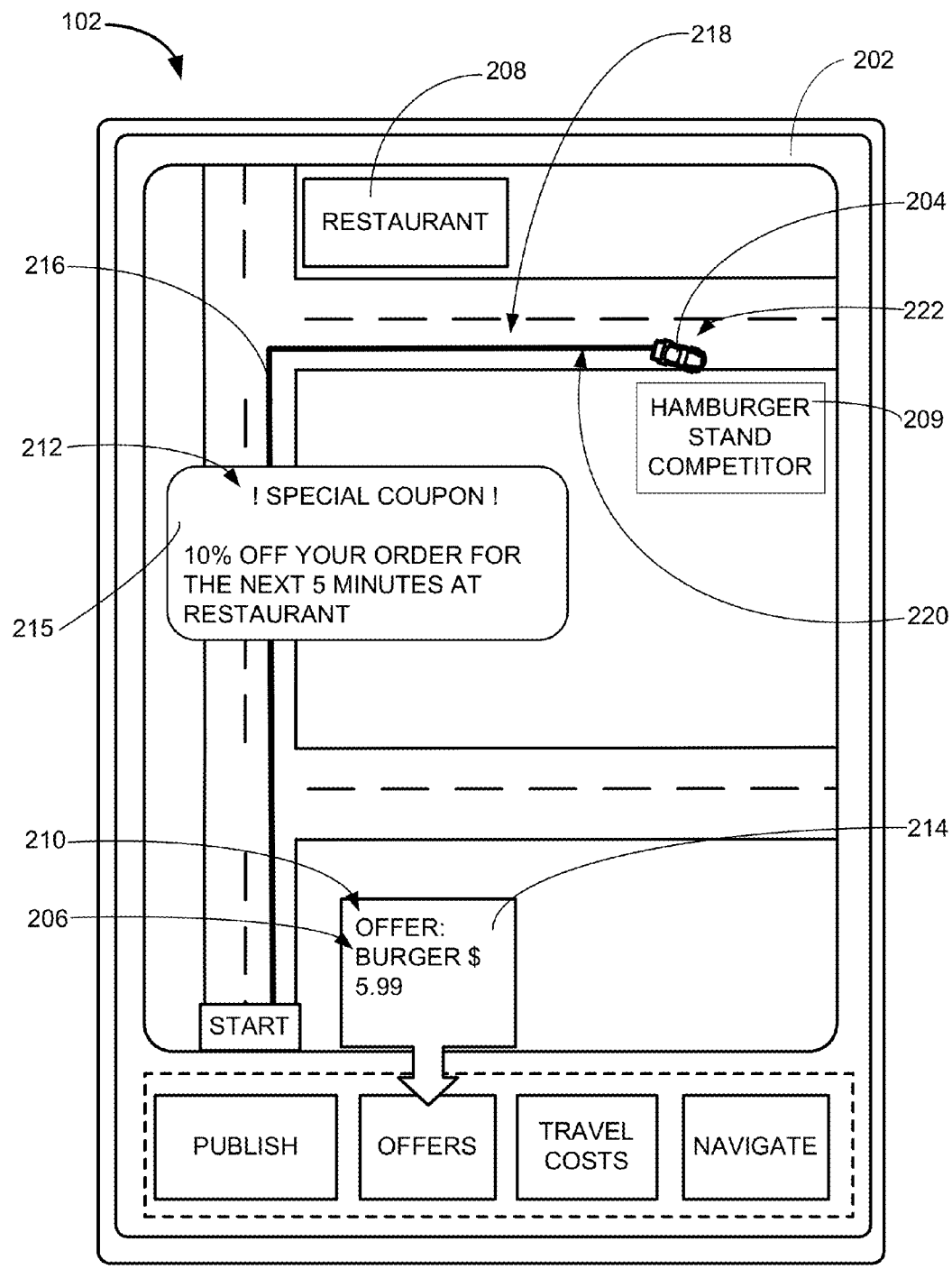
FIG. 2 is a first example of a display interface of the first device.

Referring now to FIG. 2, therein is shown a first example of a display interface 202 of the first device 102. The display interface 202 depicts a map of a geographic region of part of a city. The display interface 202 depicts a vehicle traveling past a restaurant and arriving at a hamburger stand.

A consumer location 204 is defined as the geographic location of a consumer using the navigation system 100. The movement of the consumer location 204 can be displayed on the display interface 202. The consumer can be a pedestrian or a person traveling in a vehicle. The example on the display interface 202 depicts the consumer location 204 as the location of the consumer travelling in a vehicle.

A sale item 206 is defined as an item, product, good, or service for sale. For example, the sale item 206 can include food, electronics, vehicles, books, supplies, and furniture as examples. Further, for example, the sale item 206 can be a service such as a carwash service, a dry cleaning service, or a bus tour. The sale item 206 can include a sale location 208.

The sale location 208 is defined as the geographic location of the sale item 206. The sale location 208 can be the geographic location of the store or business with the sale item 206. For example, the sale location 208 of the sale item 206 of shampoo can be the location of a drug store or a supermarket.

Further, for example, the sale location 208 of the sale item 206 can be the actual location of the sale item 206 within the store. The sale location 208 can be the store shelf where the sale item 206 is displayed within the store. The sale location 208 will be explained in further detail below.

A competitor's location 209 is defined as the geographic location of a good or service that is in competition with the sale item 206 from the sale location 208. For example, the competitor's location 209 can be a different store or shop that sales the sale item 206. If the sale location 208 is the location of "ABC Market", the competitor's location 209 can be for a warehouse club that sells the same or similar products than "ABC Market". If the sale location 208 is the location of "Bank A", the competitor's location 209 can be the location of "Bank B".

For illustrative purposes, the display interface 202 depicts the competitor's location 209 as a hamburger stand that competes with the restaurant at the sale location 208. Both the restaurant at the sale location 208 and the hamburger stand at the competitor's location 209 sell similar items such as hamburgers. The display interface 202 depicts that the driver has passed the sale location 208 and is approaching the competitor's location 209.

An initial offer 210 is defined as a price, deal, bargain, coupon, or a combination thereof for the sale item 206. For example, the initial offer 210 for a brand of shampoo can be "fifteen dollars and ninety-nine cents". The display interface 202 depicts the initial offer 210 for a burger that costs "$5.99".

The initial offer 210 can also include a bargain or discount in addition to the list price. For example, the initial offer 210 can include, "Five dollars off the normal price" or "Buy one get one Free" as examples of the initial offer 210. A seller can input the initial offer 210 into the navigation system 100 for displaying to consumers.

The initial offer 210 of the sale item 206 can have the sale location 208. For example, the initial offer 210 is linked to the sale location 208 for redeeming the initial offer 210 and purchasing the sale item 206. If the initial offer 210 is a store coupon for shampoo, the sale location 208 of the initial offer 210 is the store that offers the coupon. The consumer can use the navigation system 100 to accept the initial offer 210 and navigate to the sale location 208 to purchase the sale item 206.

A supplemental incentive offer 212 is defined as an additional discount or bargain to the initial offer 210. The supplemental incentive offer 212 can be displayed to consumers that do not purchase the sale item 206 at the price of the initial offer 210. The supplemental incentive offer 212 can be used by the seller to give ambivalent consumers an extra incentive to purchase the sale item 206 at the sale location 208. For example, the supplemental incentive offer 212 can be sent to consumers that have shown an interest in purchasing the sale item 206 but have changed their mind or are moving away from the sale location 208.

The supplemental incentive offer 212 can also be used to sell products and items on clearance or at special times. For example, the navigation system 100 can identify when the stock of the sale item 206 is low. The navigation system 100 can send the supplemental incentive offer 212 to consumers to clear out the inventory of the sale item 206.

The supplemental incentive offer 212 can also be a store-wide discount. For example, the supplemental incentive offer 212 can be "twenty percent off all items". The supplemental incentive offer 212 can rely on impulse buying by providing an additional incentive to undecided consumers to purchase the sale item 206. The supplemental incentive offer 212 will be explained in further detail below.

A notification 214 is defined as an announcement, a message, or a communication used to communicate information. The notification 214 can be in text or audio format. Buyers or consumers can receive the notification 214 with the initial offer 210.

A second notification 215 is defined as a second announcement, message, or communication used to communicate information. The second notification 215 can be in text or audio format. Buyers or consumers can receive the second notification 215 with the supplemental incentive offer 212.

An errand route 216 is defined as a navigation route for purchasing the sale item 206. The navigation system 100 can use the consumer location 204 and the sale location 208 of the initial offer 210 to generate the errand route 216. If the initial offer 210 is available in many locations within the region, the navigation system 100 can generate the errand route 216 as a route to the sale location 208 closest to the consumer location 204.

For example, if the initial offer 210 is from a supermarket chain with many locations in a city, the navigation system 100 can generate the errand route 216 to the sale location 208 that is closest to the consumer location 204. For illustrative purposes, the consumer can select the initial offer 210 to buy milk at a discount price from a regional supermarket chain. The navigation system 100 can use the consumer location 204 to route the consumer to the closest supermarket with the initial offer 210 of the discount for that brand of milk.

A consumer's vacillation 218 is defined as a situation where the consumer is identified as being interested in the sale item 206 but does not accept the initial offer 210 to purchase the sale item 206. The consumer's vacillation 218 can represent the consumer changing their mind about a purchase of the sale item 206 or switching to a similar product from a competitor. For example, the navigation system 100 can monitor the consumer's movements and actions to determine if the consumer purchases the sale item 206 or skips the purchase.

The consumer's vacillation 218 can be identified in various ways. For example, the consumer can use the navigation system 100 to purchase the sale item 206 such as milk. The navigation system 100 can display the initial offer 210 to the consumer and the consumer can accept the initial offer 210. By accepting the initial offer 210, the consumer has shown an interest in purchasing the sale item 206. The navigation system 100 can monitor the consumer during the errand route 216 to the sale location 208. If the consumer changes the destination of the errand route 216 to a different location than the sale location 208, the navigation system 100 can identify the consumer's vacillation 218.

Further, for example, the consumer's vacillation 218 can be identified if the consumer picks up the sale item 206 to examine it, but walks away from the sale location 208 without purchasing the sale item 206. The navigation system 100 can identify the consumer's vacillation 218 and generate the second notification 215 of the supplemental incentive offer 212 to be displayed to that consumer.

The consumer's vacillation 218 can include a pass by 220 of the sale location 208 and a route change 222 from the errand route 216 as examples of the consumer's vacillation 218. The pass by 220 is defined as a situation where a consumer passes the sale location 208 on the errand route 216. For example, the consumer can walk pass the store entrance of the store that sells the sale item 206.

The pass by 220 of the sale location 208 can also occur when the consumer passes the sale item 206 on the shelf at the store. The navigation system 100 can monitor the consumer's movement to identify the pass by 220. For example, if the consumer walks across the entrance of the store beyond fifty feet, the navigation system 100 can identify the pass by 220.

For illustrative purposes, the sale item 206 can be a hamburger at a seller's restaurant at the sale location 208. The consumer can accept the initial offer 210 for the hamburger and the navigation system 100 can generate the errand route 216 to the sale location 208 for the hamburger. If the consumer drives by the restaurant but proceeds to travel toward the competitor's location 209 of a hamburger stand, the navigation system 100 can identify the pass by 220.

Further, for example, the consumer can walk past the store on the errand route 216 in a shopping mall. After a certain distance from the entrance of the store, the navigation system 100 can identify the pass by 220. After identifying the pass by 220, the navigation system 100 can generate the supplemental incentive offer 212 for displaying to the consumer to encourage the consumer to enter the store.

The route change 222 is defined as a situation where a consumer changes the destination in the errand route 216 from the sale location 208 to the competitor's location 209. The navigation system 100 can identify the route change 222 and generate the second notification 215 of the supplemental incentive offer 212 to encourage the consumer to travel to the sale location 208 instead of going to a the competitor's location 209.

Figure 3:
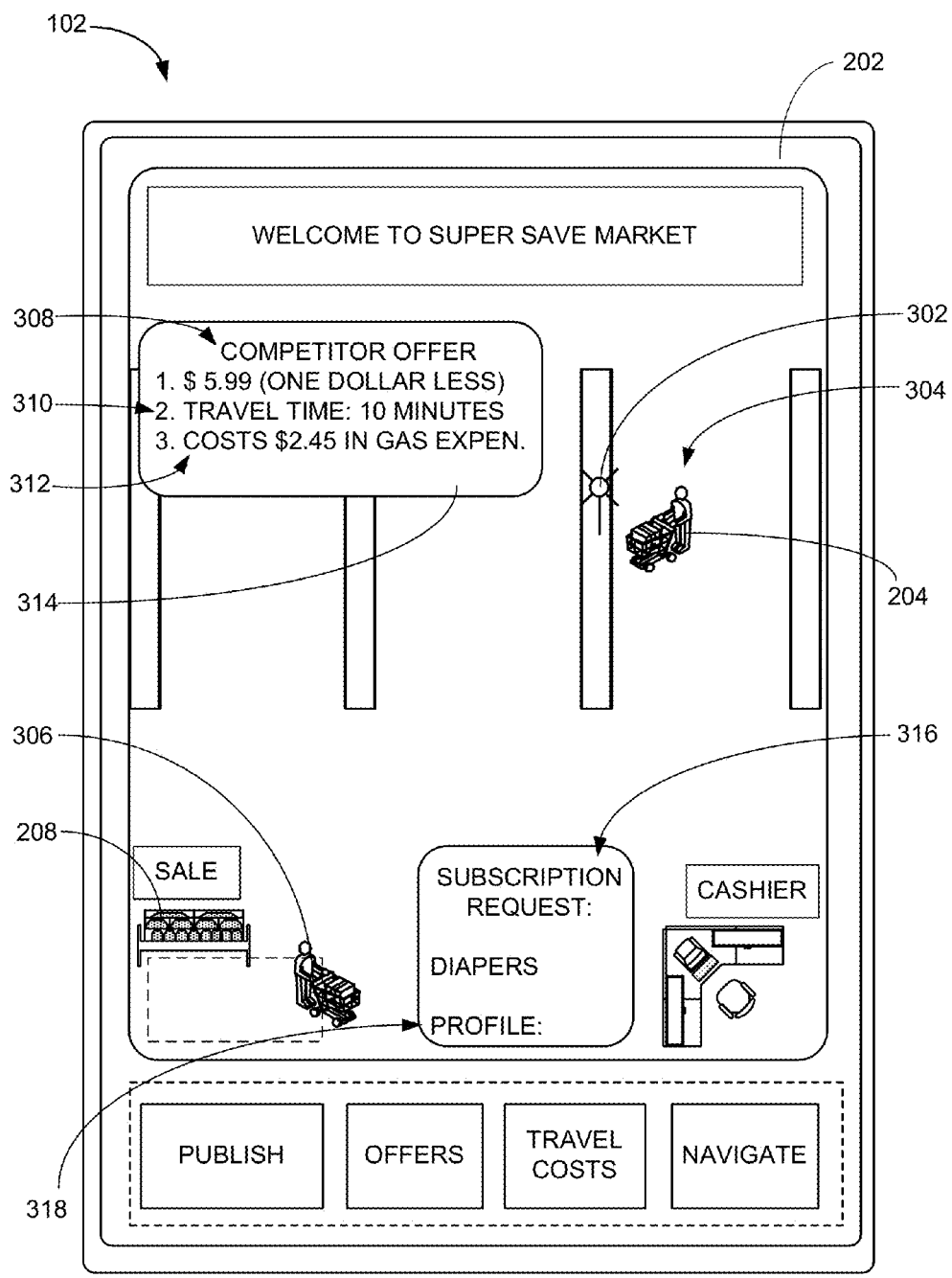
FIG. 3 is a second example of the display interface.

Referring now to FIG. 3, therein is shown a second example of the display interface 202. The display interface 202 depicts a map of the interior of a supermarket. The display interface 202 can depict the consumer location 204 as an icon of a consumer with a shopping cart.

A sensor node 302 is defined as a device that is capable of gathering sensory information and communicating and transmitting information. The sensor node 302 can be used by the navigation system 100 in multiple ways for selling the sale item 206 of FIG. 2. For example, the sensor node 302 can be a wireless device that is attached to the sale item 206 for transmitting or communicating sale information about the sale item 206.

The sensor node 302 can also be coupled to a display stand for the sale item 206 such as the store shelf that is displaying the sale item 206. When a consumer approaches the sale item 206 or a sales display, the sensor node 302 can transmit sales information to a consumer using the navigation system 100. The sensor node 302 can be a tag or transmission device that uses a radio frequency identification (RFID) system, a Bluetooth™ antenna system, a Wi-Fi system, an electromagnetic (EM) system, or a combination thereof.

The sensor node 302 can also be used to identify the proximity of the consumer to the sale item 206. For example, the sensor node 302 can be used to identify if a consumer approaches the sale item 206 on the shelf at a store. The sensor node 302 can be used to identify the distance between the sale location 208 and the consumer location 204. The sensor node 302 can also be equipped with sensory gathering devices such as an infrared sensor, a radar sensor, a sonic sensor, an optical sensor, a Wi-Fi system, an electromagnetic (EM) system, or a combination thereof.

Further, for example, the sensor node 302 can be used to determine if the consumer is holding or examining the sale item 206. The sensor node 302 can be an accelerometer attached to the sale item 206 that can identify if the consumer is lifting up the sale item 206 to their face to read the label of the item.

A consumer's inspection 304 is defined as the situation when a consumer is looking or examining the sale item 206. For example, the navigation system 100 can identify if the consumer is holding the sale item 206 for thirty seconds as the consumer's inspection 304. The navigation system 100 can be used to select a pre-determined period of time for the consumer's inspection 304. The navigation system 100 can be set to thirty seconds as a default settings but a seller or store manager can adjust the period of time using the navigation system 100.

The consumer's inspection 304 can be used to determine if the consumer is interested in the sale item 206 and for delivering the supplemental incentive offer 212 of FIG. 2 to the consumer. If the consumer picks up the sale item 206 and immediately places the item into a shopping cart, the supplemental incentive offer 212 does not need to be displayed to the consumer.

The navigation system 100 can identify the consumer's inspection 304 by using the sensor node 302 to identify the consumer's distance from the sale item 206. The navigation system 100 can also use a geofence around the sale item 206 to identify the consumer's inspection 304. For example, a consumer can be standing in front of a poster board menu of a restaurant outside the entrance of the restaurant. The navigation system 100 can identify the consumer's inspection 304 if the consumer stands in the small geographic location in front of the poster board for forty-five seconds.

The consumer's vacillation 218 of FIG. 2 includes an item rejection 306 as a type of the consumer's vacillation 218. The item rejection 306 is defined as a situation where a consumer shows disinterest in the sale item 206 after the consumer's inspection 304. The consumer can show disinterest in the sale item 206 in various ways. For example, the navigation system 100 can identify the item rejection 306 if the consumer picks up the sale item 206 for the consumer's inspection 304 and places the sale item 206 back on the store shelf.

Further, for example, the navigation system 100 can identify the item rejection 306 if the consumer walks away from the sale item 206 after the consumer's inspection 304. The navigation system 100 can use five feet as a predetermined distance for identifying the item rejection 306. The consumer can walk five feet away from the sale item 206 before the navigation system 100 identifies the item rejection 306. The navigation system 100 can be used to modify the distance for identifying the item rejection 306. For example, the distance can be assigned to twenty feet before the navigation system 100 identifies the item rejection 306.

The navigation system 100 can identify that the consumer was interested in the sale item 206 because of the consumer's inspection 304. After identifying the item rejection 306, the navigation system 100 can send the consumer the supplemental incentive offer 212 to encourage the consumer to come back to the sale location 208 to purchase the sale item 206. By identifying the consumer's inspection 304 and the item rejection 306, the supplemental incentive offer 212 is only sent to consumers that need the extra incentive to purchase the sale item 206.

A competitor's offer 308 is defined as a price listing, a deal, a coupon, a bargain, or a combination thereof from a competitor. The competitor's offer 308 is also an offer from a similar product to the sale item 206. The competitor's offer 308 is also an offer for the same item as the sale item 206 from a different store.

An extra travel time 310 is defined as the travel time it would take to arrive at the competitor's location 209 of FIG. 2 from the sale location 208 or the consumer location 204. For example, a consumer can be shopping in a store at the sale location 208 and begin comparing products the consumer sees on the shelf. The consumer can use the internet to find the competitor's offer 308 to the products that the consumer sees in the store.

The competitor's offer 308 can have the competitor's location 209 at a different store that is five miles away. The price of the competitor's offer 308 can be a dollar cheaper than the initial offer 210 of FIG. 2 for the sale item 206 at the sale location 208. The extra travel time 310 can be fifteen minutes for the consumer to travel from the sale location 208 of the initial offer 210 to the competitor's location 209 of the competitor's offer 308.

The extra travel time 310 can be displayed to the consumer. For example, the consumer can use the information from the extra travel time 310 to decide if the competitor's offer 308 at the competitor's location 209 is worth pursuing over the initial offer 210 at the sale location 208.

An extra travel cost 312 is defined as the cost in gas mileage to travel from the consumer location 204 to the competitor's location 209 of the competitor's offer 308. For example, the competitor's offer 308 can be fifty cents cheaper than the initial offer 210. The extra travel cost 312 can be "$2.45" for the cost in mileage to travel to the competitor's location 209.

The extra travel cost 312 can be displayed to the consumer. For example, the consumer can use the information from the extra travel cost 312 to decide if the competitor's offer 308 at the competitor's location 209 is worth pursuing over the initial offer 210 at the sale location 208.

A competitor notification 314 is defined as an announcement, a message, or a communication used to communicate information. The competitor notification 314 can be in text or audio format. Buyers or consumers can receive the competitor notification 314 that displays the extra travel time 310 and the extra travel cost 312.

A subscription request 316 is defined as a request for specific goods, brands, or stores. Consumers can use the subscription request 316 to request deals, coupons, and sales from the navigation system 100. For example, a consumer can input a request for diapers as the subscription request 316. The navigation system 100 can receive the subscription request 316 and identify available deals and coupons for diapers. The navigation system 100 can send the initial offer 210 of diapers to the consumer.

Further, for example, if a consumer has a preference for the brand of "ABC Diapers", the consumer can input a request for the brand of "ABC Diapers" as the subscription request 316. If available, the navigation system 100 can send the initial offer 210 for "ABC diapers" to the consumer. The subscription request 316 can also be for all sales and coupons for "ABC" brand or all sales and coupons for a specific store.

A subscription profile 318 is defined as a record associated with a consumer that contains the consumer's purchase preferences, interests, and favorite stores, brands, and products. The subscription profile 318 can be updated based on the subscription request 316. For example, the consumer can make the subscription request 316 for "ABC" products. If available, the navigation system 100 can send the initial offer 210 for "ABC" products to the consumer. The navigation system 100 can update the subscription profile 318 to include the consumer's preference for "ABC" products. If additional deals for "ABC" products become available, the consumer can receive additional targeted notifications because the consumer's preference was recorded in the subscription profile 318.

Figure 4:
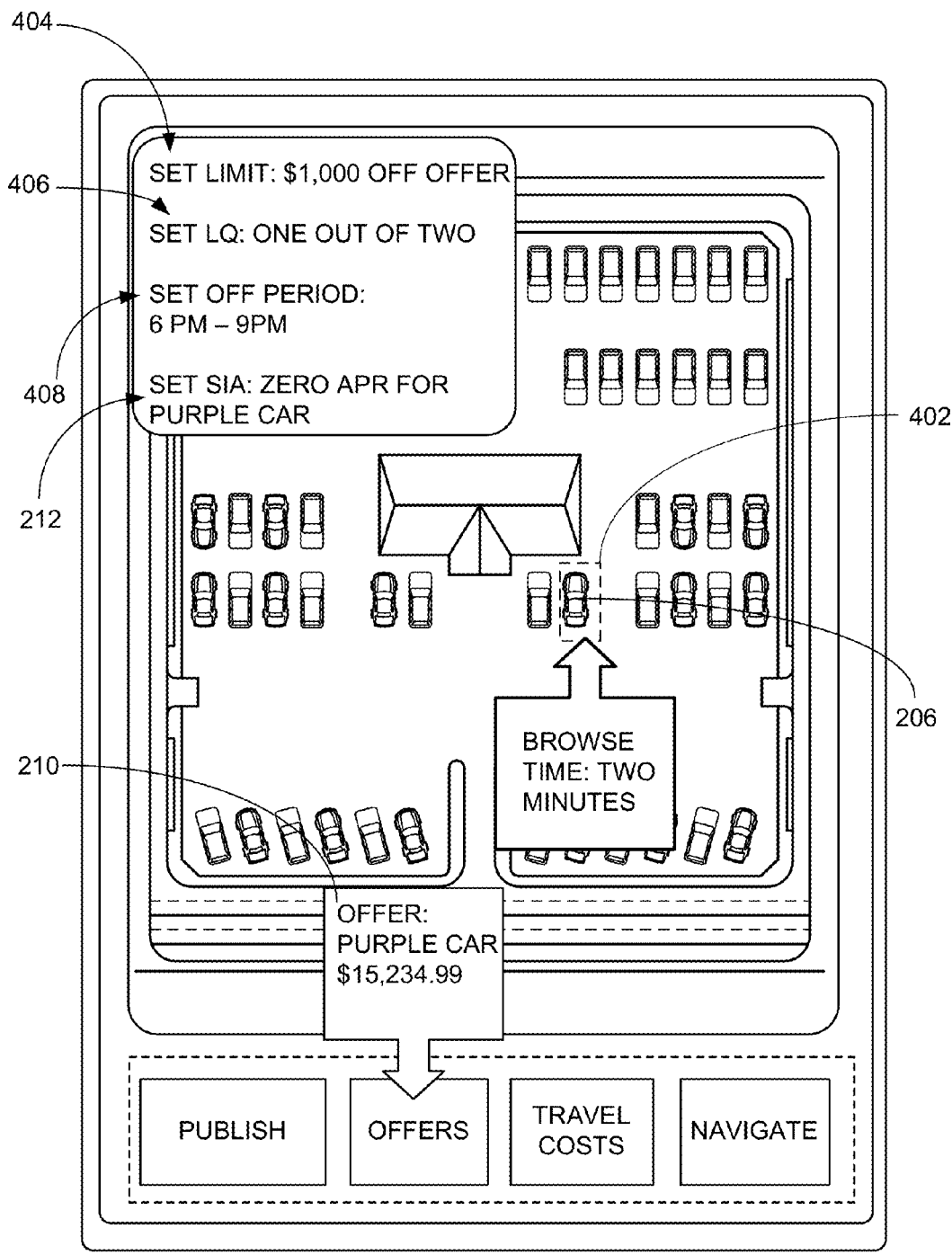
FIG. 4 is a third example of the display interface.

Referring now to FIG. 4, therein is shown a third example of the display interface 202. The display interface 202 depicts a map of a car dealership. For illustrative purposes, the display interface 202 can show how a seller can use the navigation system 100 to publish the initial offer 210 and the supplemental incentive offer 212.

A browse zone 402 is defined as a virtual perimeter or geofence for a geographic area. The browse zone 402 can be a small geofence that is assigned to surround or be adjacent to the sale item 206. For example, the browse zone 402 can be designated to be a small geographic area in front of a sale sign. If the consumer stands in the browse zone 402, the navigation system 100 can identify the consumer's inspection 304 of FIG. 3 of the sale sign.

The navigation system 100 can be used to set the boundaries of the browse zone 402. For example, the navigation system 100 can assign a three square foot geofence around the sale item 206 as the browse zone 402 for the sale item 206. The navigation system 100 can also be used to expand and decrease the size of the browse zone 402.

For illustrative purposes, the sale item 206 can be a car at a car dealership. The seller can designate the browse zone 402 as a small two square foot geofence near the car's sticker information that includes the car's price and mileage information. The seller can designate that if a consumer stands within the browse zone 402 for three minutes, the consumer's inspection 304 has occurred.

The browse zone 402 can also encompass the location of the sensor node 302 of FIG. 3. For example, the sensor node 302 can be placed inside the car for sale. The navigation system 100 can identify the location of the sensor node 302 and assign the browse zone 402 based on the location of the sensor node 302.

A price-match limit 404 is defined as the limit to how low the navigation system 100 can modify the supplemental incentive offer 212. The navigation system 100 can modify the supplemental incentive offer 212 to be lower than the competitor's offer 308 of FIG. 3 but limited to the price-match limit 404.

For example, the manager of the car dealership can set the price-match limit 404 to one thousand dollars below the initial offer 210. This price represents the limit to how far the manager is willing to reduce the price for the supplemental incentive offer 212. The consumer can then find the competitor's offer 308 for a similar car that is two thousand dollars below the initial offer 210.

The navigation system 100 can identify the competitor's offer 308 and modify the supplemental incentive offer 212 to one thousand dollars below the initial offer 210 instead of two thousand dollars. The navigation system 100 will not modify the supplemental incentive offer 212 below the price-match limit 404. The supplemental incentive offer 212 that is sent to the consumer will not be lower than one thousand dollars below the price of the initial offer 210.

The navigation system 100 can apply or disable the price-match limit 404 for different situations. For example, the navigation system 100 can ignore the price-match limit 404 to the supplemental incentive offer 212 at different times of the day or different days of the week. For example, during the hours or days that the store receives very little business, the navigation system 100 can ignore the price-match limit 404 for the supplemental incentive offer 212. The supplemental incentive offer 212 sent to consumers is better than the price of the competitor's offer 308 in this situation.

A low inventory 406 is defined as a threshold amount in the stock of the sale item 206 to trigger a clearance of the sale item 206. For example, a computer store may have an initial stock of fifty laptops for sale. The laptops can be last year's model and after sales, the remaining stock can be ten laptops.

The store manager can use the navigation system 100 to identify the low inventory 406 as ten laptops and use the navigation system 100 to help clear out the laptops to make room for new models of laptops. The navigation system 100 can generate the second notification 215 of the supplemental incentive offer 212 when the low inventory 406 is identified.

For example, the low inventory 406 can be set by the seller to be ten percent remaining of the initial stock of one hundred garments. The navigation system 100 can monitor the sale and store inventory databases for when the inventory of garments reaches the low inventory 406. The navigation system 100 can generate the second notification 215 of the supplemental incentive offer 212 to help clear out the remaining stock of garments when the low inventory 406 is identified.

An off-season period 408 is defined as a time period where a business receives the fewest sales, clients, or visitors. The off-season period 408 can be a range of hours in a day, days in a month, or months out of the year. A seller or store manager can assign the off-season period 408 for the sale item 206. The navigation system 100 can identify the off-season period 408 and generate the second notification 215 of the supplemental incentive offer 212 to help generate increased business during the off-season period 408.

For example, the off-season period 408 can be summer months for skiing and snowboarding equipment. If a consumer is browsing skiing equipment during the summer in a store, the navigation system 100 can generate the second notification 215 of the supplemental incentive offer 212 for the sale item 206. The off-season period 408 can be assigned to the hours near closing time of a restaurant on a particular day with a surplus of perishable goods. For example, the navigation system 100 can generate the supplemental incentive offer 212 for a consumer that walked by a bakery for a deal on day old bread before closing time.

Figure 5:
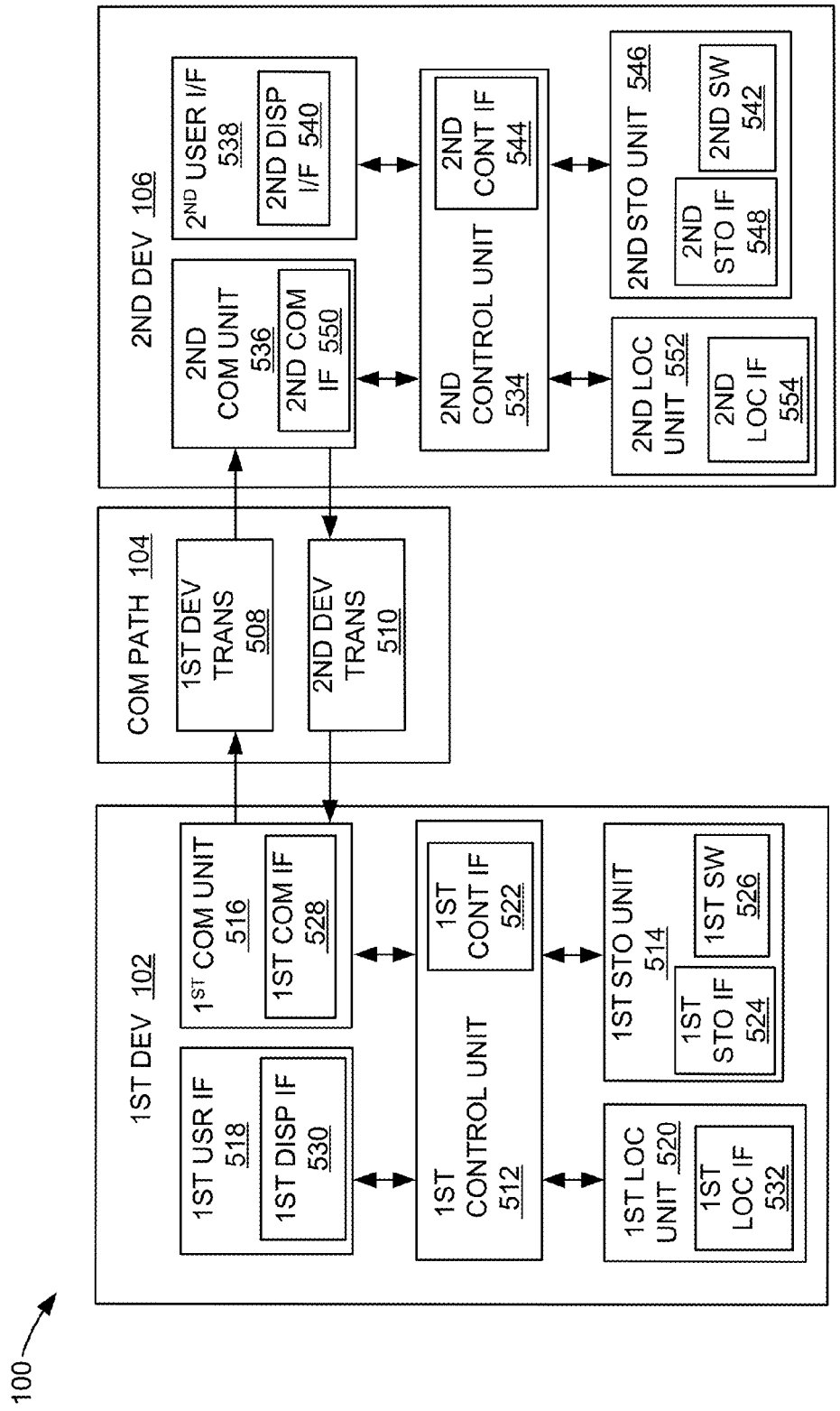
FIG. 5 is an exemplary block diagram of the navigation system.

Referring now to FIG. 5, therein is shown an exemplary block diagram of the navigation system 100. The first device 102 can send information in a first device transmission 508 over the communication path 104 to the second device 106. The second device 106 can send information in a second device transmission 510 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 512, a first storage unit 514, a first communication unit 516, a first user interface 518, and a first location unit 520. The first device 102 of FIG. 5 can be similarly described by the first device 102 of FIG. 1.

The first control unit 512 can include a first control interface 522. The first control unit 512 can execute a first software 526 to provide the intelligence of the navigation system 100. The first control unit 512 can be implemented in a number of different manners. For example, the first control unit 512 can be a processor, an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations external to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The first location unit 520 can generate location information, current heading, and current speed of the first device 102, as examples. The first location unit 520 can be implemented in many ways. For example, the first location unit 520 can function as at least a part of a global positioning system (GPS), an inertial navigation system, a cellular-tower location system, a pressure location system, or any combination thereof.

The first location unit 520 can include a first location interface 532. The first location interface 532 can be used for communication between the first location unit 520 and other functional units in the first device 102. The first location interface 532 can also be used for communication that is external to the first device 102.

The first location interface 532 can receive information from the other functional units or from external sources, or can transmit information to the other functional units or to external destinations. The external sources and the external destinations refer to sources and destinations external to the first device 102.

The first location interface 532 can include different implementations depending on which functional units or external units are being interfaced with the first location unit 520. The first location interface 532 can be implemented with technologies and techniques similar to the implementation of the first control interface 522.

The first storage unit 514 can store the first software 526. The first storage unit 514 can also store the relevant information, such as advertisements, points of interest (POI), navigation routing entries, or any combination thereof.

The first storage unit 514 can be a volatile memory, a nonvolatile memory, an internal memory, an external memory, or a combination thereof. For example, the first storage unit 514 can be a nonvolatile storage such as nonvolatile random access memory (NVRAM), Flash memory, disk storage, or a volatile storage such as static random access memory (SRAM).

The first storage unit 514 can include a first storage interface 524. The first storage interface 524 can be used for communication between the first location unit 520 and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations external to the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106 of FIG. 1, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, or any combination thereof to provide data and communication inputs.

The first user interface 518 can include a first display interface 530. Examples of the first display interface 530 can include the display interface 202 of FIG. 2. The first display interface 530 can include a display, a projector, a video screen, a speaker, or any combination thereof. The screenshot shown on the display interface 202 described in FIG. 2 can represent an example of a screenshot for the navigation system 100.

The first control unit 512 can operate the first user interface 518 to display information generated by the navigation system 100. The first control unit 512 can also execute the first software 526 for the other functions of the navigation system 100, including receiving location information from the first location unit 520. The first control unit 512 can further execute the first software 526 for interaction with the communication path 104 via the first communication unit 516.

The second device 106 can be optimized for implementing the present invention in a multiple device embodiment with the first device 102. The second device 106 can provide the additional or higher performance processing power compared to the first device 102. The second device 106 can include a second control unit 534, a second communication unit 536, a second user interface 538, and a second location unit 552.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the navigation system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the navigation system 100, including operating the second communication unit 536 to communicate with the first device 102 over the communication path 104.

The second control unit 534 can be implemented in a number of different manners. For example, the second control unit 534 can be a processor, an embedded processor, a microprocessor, a hardware control logic, a hardware finite state machine (FSM), a digital signal processor (DSP), or a combination thereof.

The second control unit 534 can include a second controller interface 544. The second controller interface 544 can be used for communication between the second control unit 534 and other functional units in the second device 106. The second controller interface 544 can also be used for communication that is external to the second device 106.

The second controller interface 544 can receive information from the other functional units or from external sources, or can transmit information to the other functional units or to external destinations. The external sources and the external destinations refer to sources and destinations external to the second device 106.

The second controller interface 544 can be implemented in different ways and can include different implementations depending on which functional units or external units are being interfaced with the second controller interface 544. For example, the second controller interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as advertisements, points of interest (POI), navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the navigation system 100 is shown with the second storage unit 546 as a single hierarchy storage system, although it is understood that the navigation system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM).

The second storage unit 546 can include a second storage interface 548. The second storage interface 548 can be used for communication between the first location unit 520 and other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations external to the second device 106.

The second storage interface 548 can include different implementations depending on which functional units or external units are being interfaced with the second storage unit 546. The second storage interface 548 can be implemented with technologies and techniques similar to the implementation of the second controller interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second controller interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The navigation system 100 can be executed by the first control unit 512, the second control unit 534, or a combination thereof.

The second location unit 552 can receive location information, current heading, and current speed of the first device 102, as examples. The second location unit 552 can be implemented in many ways. For example, the second location unit 552 can function as at least a part of a global positioning system (GPS), an inertial navigation system, a cellular-tower location system, a pressure location system, or any combination thereof.

The second location unit 552 can include a second location interface 554. The second location interface 554 can be used for communication between the second location unit 552 and other functional units in the first device 102. The second location interface 554 can also be used for communication that is external to the second device 106.

The second location interface 554 can receive information from the other functional units or from external sources, or can transmit information to the other functional units or to external destinations. The external sources and the external destinations refer to sources and destinations external to the second device 106.

The second location interface 554 can include different implementations depending on which functional units or external units are being interfaced with the second location unit 552. The second location interface 554 can be implemented with technologies and techniques similar to the implementation of the second controller interface 544.

For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the first location unit 520, although it is understood that the second device 106 can also operate the first location unit 520.

Referring now to FIG. 6, therein is shown a control flow of the navigation system 100. The navigation system 100 can include a publish module 602, a subscription module 603, an offer module 604, a navigation module 606, a monitor module 608, an alternative module 610, a modify module 612, and an incentive module 614. In the navigation system 100, as an example, each module is indicated by a number and successively higher module numbers follow one another. Control flow can pass from one module to the next higher numbered module unless explicitly otherwise indicated.

The publish module 602 receives information for selling the sale item 206 of FIG. 2. The publish module 602 can be coupled to the first user interface 518 of FIG. 5 for receiving the information. A seller can use the publish module 602 to publish the initial offer 210 of FIG. 2, and the supplemental incentive offer 212 of FIG. 2 for the sale item 206. The publish module 602 can receive information about the sale item 206. The seller can input information about the sale item 206 into the first device 102 of FIG. 1 through the first user interface 518.

The publish module 602 can also receive the sale location 208 of FIG. 2. The seller can also assign the price-match limit 404 of FIG. 4, the low inventory 406 of FIG. 4, and the off-season period 408 of FIG. 4 for the sale item 206 by using the publish module 602. The publish module 602 will be explained in further detail below.

The subscription module 603 receives the subscription request 316 of FIG. 3 for sending the initial offer 210 to consumers. For example, the subscription request 316 can be for a specific product, brand, or store. The subscription module 603 can identify deals and coupons for the subscription request 316 by searching the internet or store databases for the subscription request 316. The subscription module 603 can be coupled to the offer module 604 for generating the initial offer 210 to consumers.

The subscription module 603 also updates the subscription profile 318 based on the subscription request 316 that are received. For example, the subscription module 603 can update the subscription profile 318 of FIG. 3 to indicate that the consumer has a preference for "ABC Diapers", "Super Save Market" stores, and Hamburgers because of the subscription request 316 for these items.

The subscription module 603 uses the subscription profile 318 for sending specific types of the initial offer 210 to consumers. For example, if the subscription request 316 is for the sale item 206 of "ABC Diapers", the subscription module 603 can update the subscription profile 318 to indicate that the consumer has a preference for "ABC Diapers". The subscription module 603 can be coupled to the communication path 104 of FIG. 1 to identify sales and other notifications for "ABC Diapers". If the subscription module 603 identifies a sale on "ABC Diapers", the subscription module 603 can send a request to the offer module 604 to generate the initial offer 210 to the consumer that requested "ABC Diapers".

The offer module 604 generates the notification 214 of FIG. 2 of the initial offer 210 to for displaying to consumers. For example, the offer module 604 can generate the notification 214 for displaying on the display interface 202 of FIG. 2. The offer module 604 can receive information about the initial offer 210 from the publish module 602. The offer module 604 can generate the notification 214 with the initial offer 210 for displaying to consumers.

The navigation module 606 generates the errand route 216 of FIG. 2 by generating a route from the consumer location 204 of FIG. 2 to the sale location 208. For illustrative purposes, the initial offer 210 of the sale item 206 can be from a regional store chain with many locations near the consumer. The navigation system 100 can use the consumer location 204 to find the sale location 208 closest to the consumer. The navigation system 100 can generate the errand route 216 to the sale location 208 closest to the consumer for generating the shortest errand for purchasing the sale item 206.

The navigation module 606 can also generate a route to the sale location 208 inside a store. For example, if the consumer enters a large warehouse store, the navigation system 100 can route the consumer directly to the store shelf with the sale item 206. The sale item 206 or the display stand of the sale item 206 can be equipped with the sensor node 302. The sensor node 302 can be used to identify the sale location 208. The geographic coordinates of the sale item 206 can also be inputted into the navigation system 100 to identify the sale location 208.

The consumer can travel directly to the sale item 206 without getting lost in the store or having their attention diverted by other products for sale. The navigation module 606 can also identify the route change 222 of FIG. 2 if the consumer navigates to the sale location 208 of the competitor's offer 308 of FIG. 3.

The monitor module 608 monitors consumer actions during the errand route 216 to the sale location 208. For example, the monitor module 608 can monitor the consumer's movement in a store, if the consumer is equipped with sensors such as the first device 102. The monitor module 608 can also identify the competitor's offer 308 and the consumer's vacillation 218 of FIG. 2. The monitor module 608 will be explained in further detail below.

The alternative module 610 generates the competitor notification 314 of FIG. 3 of the extra travel time 310 of FIG. 3 and the extra travel cost 312 of FIG. 3 for displaying to the consumer. For example, the alternative module 610 generates the competitor notification 314 to be displayed on the display interface 202. The alternative module 610 can receive information about the extra travel time 310 and the extra travel cost 312 from the monitor module 608 for displaying to the consumer.

The modify module 612 modifies the supplemental incentive offer 212 based on the competitor's offer 308 of FIG. 3 and the price-match limit 404 of FIG. 4. For example, the navigation system 100 can modify the supplemental incentive offer 212 to be lower than the competitor's offer 308. A store manager can assign the supplemental incentive offer 212 to $2.99 for a gallon of milk. The navigation system 100 can identify the competitor's offer 308 for milk for $2.90. The modify module 612 can modify the supplemental incentive offer 212 to $2.89 to encourage the consumer to buy the sale item 206.

The modify module 612 can use the price-match limit 404 to limit the reduction of the supplemental incentive offer 212. For example, the store manager can set the price-match limit 404 to "$2.95" for milk to limit the price reduction of the item. The modify module 612 can reduce the price of milk to "$2.95" instead of reducing the price to $2.89 from the last example.

The incentive module 614 generates the second notification 215 of FIG. 2 of the supplemental incentive offer 212 to be displayed to the consumer. If the monitor module 608 identifies the consumer's vacillation 218, the incentive module 614 can generate the supplemental incentive offer 212 to the consumer. The incentive module 614 can generate the second notification 215 for displaying on the display interface 202. The second notification 215 of the supplemental incentive offer 212 takes advantage of impulse buying by encouraging the sale of the sale item 206 over the competitor's offer 308 with an additional discount.

The physical transformation from generating the notification 214 of the initial offer 210 and monitoring for the consumer's vacillation 218 of the sale item 206 results in movement in the physical world, such as people using the first device 102 based on the operation of the navigation system 100. As the movement in the physical world occurs, the movement itself creates additional information that is converted back to the second notification 215 and the supplemental incentive offer 212 for the continued operation of the navigation system 100 and to continue the movement in the physical world.

The navigation system 100 can be implemented on the first device 102 of FIG. 5, on the second device 106 of FIG. 5, or partitioned between the first device 102 and the second device 106. The first software 526 of FIG. 5 of the first device 102 can include the navigation system 100. For example, the first software 526 can include the publish module 602, the subscription module 603, the offer module 604, the navigation module 606, the monitor module 608, the alternative module 610, the modify module 612, and the incentive module 614. The first control unit 512 of FIG. 5 can execute the first software 526.

The first control unit 512 can execute the publish module 602 to receive the initial offer 210 and the supplemental incentive offer 212 from a seller. The first control unit 512 can execute the subscription module 603 to receive the subscription request 316. The first control unit 512 can execute the offer module 604 to generate the notification 214 of the initial offer 210 for delivering to the consumer. The first control unit 512 can execute the navigation module 606 to generate the errand route 216 to the sale location 208.

The first control unit 512 can execute the monitor module 608 to monitor the consumer's actions during the errand route 216. The alternative module 610 can generate the competitor notification 314 of the extra travel time 310 and the extra travel cost 312 for displaying to the consumer. The first control unit 512 can execute the modify module 612 to modify the supplemental incentive offer 212 to be lower than the competitor's offer 308. The first control unit 512 can execute the incentive module 614 to generate the second notification 215 of the supplemental incentive offer 212 for delivery to the consumer.

The first user interface 518 of FIG. 5 can be used to input the initial offer 210 and the supplemental incentive offer 212 into the publish module 602. The first communication unit 516 of FIG. 5 can be used by the navigation module 606 to send and receive navigation information. The offer module 604, the alternative module 610, and the incentive module 614 can use the first display interface 530 to display the notification 214, the second notification 215, and the competitor notification 314.

In an example for the second device 106 of FIG. 5, the second software 542 of FIG. 5 can include the navigation system 100. For example, the second software 542 can include the publish module 602, the subscription module 503, the offer module 604, the navigation module 606, the monitor module 608, the alternative module 610, the modify module 612, and the incentive module 614. The second control unit 534 of FIG. 5 can execute the second software 542.

The second control unit 534 can execute the publish module 602 to receive the initial offer 210 and the supplemental incentive offer 212 from a seller. The second control unit 532 can execute the subscription module 603 to receive the subscription request 316. The second control unit 534 can execute the offer module 604 to generate the notification 214 of the initial offer 210 for delivering to the consumer. The second control unit 534 can execute the navigation module 606 to generate the errand route 216 to the sale location 208.

The second control unit 534 can execute the monitor module 608 to monitor the consumer's actions during the errand route 216. The alternative module 610 can generate the competitor notification 314 of the extra travel time 310 and the extra travel cost 312 for displaying to the consumer. The second control unit 534 can execute the modify module 612 to modify the supplemental incentive offer 212 to be lower than the competitor's offer 308. The second control unit 534 can execute the incentive module 614 to generate the second notification 215 of the supplemental incentive offer 212 for delivery to the consumer.

The second user interface 538 of FIG. 5 can be used to input the initial offer 210 and the supplemental incentive offer 212 into the publish module 602. The second communication unit 536 of FIG. 5 can be used by the navigation module 606 to send and receive navigation information. The offer module 604, the alternative module 610, and the incentive module 614 can use the second display interface 540 to display the notification 214, the second notification 215, and the competitor notification 314.

In another example, the navigation system 100 can be partitioned between the first software 526 and the second software 542. For example, the first software 526 can include the publish module 602. The second software 542 can include the subscription module 603, the offer module 604, the navigation module 606, the monitor module 608, the alternative module 610, the modify module 612, and the incentive module 614. The second control unit 534 can execute modules partitioned on the second software 542 and the first control unit 512 can execute modules partitioned on the first software 526.

The second control unit 532 can execute the subscription module 603 to receive the subscription request 316. The second control unit 534 can execute the offer module 604 to generate the notification 214 of the initial offer 210 for delivering to the consumer. The second control unit 534 can execute the navigation module 606 to generate the errand route 216 to the sale location 208.

The second control unit 534 can execute the monitor module 608 to monitor the consumer's actions during the errand route 216. The alternative module 610 can generate the competitor notification 314 of the extra travel time 310 and the extra travel cost 312 for displaying to the consumer. The second control unit 534 can execute the modify module 612 to modify the supplemental incentive offer 212 to be lower than the competitor's offer 308. The second control unit 534 can execute the incentive module 614 to generate the second notification 215 of the supplemental incentive offer 212 for delivery to the consumer.

The second communication unit 536 can be used by the navigation module 606 to send and receive navigation information. The offer module 604, the alternative module 610, and the incentive module 614 can use the second display interface 540 to display the notification 214, the second notification 215, and the competitor notification 314.

The first control unit 512 can execute the publish module 602 to receive the initial offer 210 and the supplemental incentive offer 212 from a seller. The first user interface 518 can be used to input the initial offer 210 and the supplemental incentive offer 212 into the publish module 602.

It has been discovered that the present invention provides the navigation system 100 with location-based supplemental incentive notification mechanism for increasing sells of the sale item 206 by using the supplemental incentive offer 212. The seller can use the navigation system 100 for publishing the initial offer 210 and the supplemental incentive offer 212. Sellers can also designate the sale location 208 of the sale item 206 so that consumers can use the errand route 216 to directly navigate to the sale item 206 within a store.

It has also been discovered that the present invention targets ambivalent consumers and impulse buyers by monitoring consumer behavior and by sending consumer notifications with additional incentives. Sellers and store managers can identify consumer behavior and send the initial offer 210 and the supplemental incentive offer 212 to consumers to encourage impulse buying of the sale item 206.

The navigation system 100 can monitor consumer behavior by identifying the consumer's vacillation 218. The navigation system 100 can identify if the consumer is uncertain, changing their mind about a product, or purchasing the competitor's offer 308 of a similar item. The navigation system 100 can generating the second notification 215 of the supplemental incentive offer 212 based on the consumer's vacillation 218.

The supplemental incentive offer 212 can be used to only target consumers that need the extra incentive to purchase the sale item 206 and takes advantage of impulse buying behavior. The navigation system 100 allows sellers to benefit from the supplemental incentive offer 212 by sending the supplemental incentive offer 212 to consumers who need the extra incentive for a purchase and thus avoids sending the extra discount to all consumers.

It has also been discovered that the present invention allows the consumer to benefit from the supplemental incentive offer 212 because the navigation system 100 prevents the consumer from receiving unwanted and irrelevant notifications. The second notification 215 is only sent to consumers that have examined or shown an interest in the sale item 206.

The navigation system 100 describes the module functions or order as an example. The modules can be partitioned differently. For example, the publish module 602, the offer module 604, the navigation module 606, the monitor module 608, the alternative module 610, the modify module 612, and the incentive module 614 can be implemented as one module or with lesser number of modules. Each of the modules can operate individually and independently of the other modules.

Referring now to FIG. 7, therein is shown a control flow of the publish module 602. The publish module 602 receives information to publish the initial offer 210 of FIG. 2 and the supplemental incentive offer 212 of FIG. 2 for selling the sale item 206 of FIG. 2. The publish module 602 can include a list module 702, a location module 704, a supplemental module 706, a limit module 708, and a clearance module 710. Control flow can pass from one module to the next higher numbered module unless explicitly otherwise indicated.

The list module 702 receives the price, conditions or details of the initial offer 210 for the sale item 206. For example, the navigation system 100 can receive the price of the sale item 206 to create the initial offer 210. The list module 702 can send the information about the initial offer 210 to the offer module 604 of FIG. 6. The offer module 604 can publish the initial offer 210 to consumers by generating the notification 214 of FIG. 2 of the initial offer 210.

The location module 704 identifies the sale location 208 of FIG. 2 of the initial offer 210 of the sale item 206. The location module 704 can receive the address of the store as the sale location 208 through a location mechanism such as a GPS or through manual input of the street address. The sale item 206 can also be equipped with RFID tags, electromagnetic tags, GPS, communication sensors, or a combination thereof to identify the sale location 208 of the sale item 206 within the store.

The supplemental module 706 receives the supplemental incentive offer 212. The supplemental module 706 can receive prices, coupons, bargains, discounts or a combination thereof for the supplemental incentive offer 212. The supplemental module 706 can receive the supplemental incentive offer 212 for displaying to the consumer in the second notification 215.

The limit module 708 receives the price-match limit 404 of FIG. 4. The limit module 708 can receive the price-match limit 404 for limiting the price reduction of the supplemental incentive offer 212. The limit module 708 can send the price-match limit 404 to the modify module 612 of FIG. 6. The modify module 612 can use the price-match limit 404 for modifying the supplemental incentive offer 212.

The clearance module 710 receives clearance information including the low inventory 406 of FIG. 4 and the off-season period 408 of FIG. 4 for generating the competitor notification 314 of FIG. 3 of the supplemental incentive offer 212. The clearance module 710 can receive the conditions for the low inventory 406 and the off-season period 408 into the navigation system 100. For example, the low inventory 406 can be twenty percent of the initial stock of the sale item 206 remaining. Further, for example, the off-season period 408 can be a calendar period like the month of January for the sale of summer products.

The physical transformation from designating the price-match limit 404, the low inventory 406, and the off-season period 408 results in movement in the physical world, such as people using the publish module 602 based on the operation of the navigation system 100. As the movement in the physical world occurs, the movement itself creates additional information that is converted back to the supplemental incentive offer 212 for the continued operation of the navigation system 100 and to continue the movement in the physical world.

The modules of the publish module 602 can be implemented on the first device 102 of FIG. 5, on the second device 106 of FIG. 6, or partitioned between the first device 102 and the second device 106. The first software 526 of FIG. 5 of the first device 102 of FIG. 5 can include the navigation system 100. For example, the first software 526 can include the list module 702, the location module 704, the supplemental module 706, the limit module 708, and the clearance module 710. The first control unit 512 of FIG. 5 can execute the first software 526.

The first control unit 512 can execute the list module 702 to receive information about the initial offer 210. The first control unit 512 can execute the location module 704 to identify the sale location 208 of the sale item 206. The first control unit 512 can execute the supplemental module 706 to receive information about the supplemental incentive offer 212.

The first control unit 512 can execute the limit module 708 to receive the price-match limit 404. The first control unit 512 can execute the clearance module 710 to receive the low inventory 406 and the off-season period 408. The location module 704 can use the first communication unit 516 of FIG. 5 to send and receive navigation information.

In an example for the second device 106 of FIG. 5, the second software 542 of FIG. 5 can include the publish module 602. For example, the second software 542 can include the list module 702, the location module 704, the supplemental module 706, the limit module 708, and the clearance module 710. The second control unit 534 of FIG. 5 can execute the second software 542.

The second control unit 534 can execute the list module 702 to receive information about the initial offer 210. The second control unit 534 can execute the location module 704 to identify the sale location 208 of the sale item 206. The second control unit 534 can execute the supplemental module 706 to receive information about the supplemental incentive offer 212.

The second control unit 534 can execute the limit module 708 to receive the price-match limit 404. The second control unit 534 can execute the clearance module 710 to receive the low inventory 406 and the off-season period 408. The location module 704 can use the second communication unit 536 to send and receive navigation information.

In another example, the publish module 602 can be partitioned between the first software 526 and the second software 542. For example, the first software 526 can include the location module 704. The second software 542 can include the list module 702, the supplemental module 706, the limit module 708, and the clearance module 710. The second control unit 534 can execute modules partitioned on the second software 542 and the first control unit 512 can execute modules partitioned on the first software 526.

The second control unit 534 can execute the list module 702 to receive information about the initial offer 210. The second control unit 534 can execute the supplemental module 706 to receive information about the supplemental incentive offer 212.

The second control unit 534 can execute the limit module 708 to receive the price-match limit 404. The second control unit 534 can execute the clearance module 710 to receive the low inventory 406 and the off-season period 408.

The first control unit 512 can execute the location module 704 to identify the sale location 208 of the sale item 206. The location module 704 can use the first communication unit 516 of FIG. 5 to send and receive navigation information.

It has been discovered that the present invention provides the navigation system 100 for use in clearance sales of the sale item 206. The navigation system 100 can identity when the sale item 206 is on clearance and providing interested consumers with the supplemental incentive offer 212 for the sale item 206. For example, the navigation system 100 allows a seller to provide the competitor notification 314 to consumers for clearing out the low inventory 406 of the sale item 206 or for clearing out the sale item 206 during the off-season period 408.

The seller can designate the low inventory 406 of the sale item 206 and the off-season period 408 in the navigation system 100. The navigation system 100 can identify the low inventory 406 of the inventory of the sale item 206. The navigation system 100 can generate the supplemental incentive offer 212 after identifying the low inventory 406. The navigation system 100 can also identify the off-season period 408 and generate the supplemental incentive offer 212 to be displayed to consumers.

The navigation system 100 describes the module functions or order as an example. The modules can be partitioned differently. For example, the publish module 602 can include the list module 702, the location module 704, the supplemental module 706, the limit module 708, and the clearance module 710 can be implemented as one module or with lesser number of modules. Each of the modules can operate individually and independently of the other modules.

Figure 8:
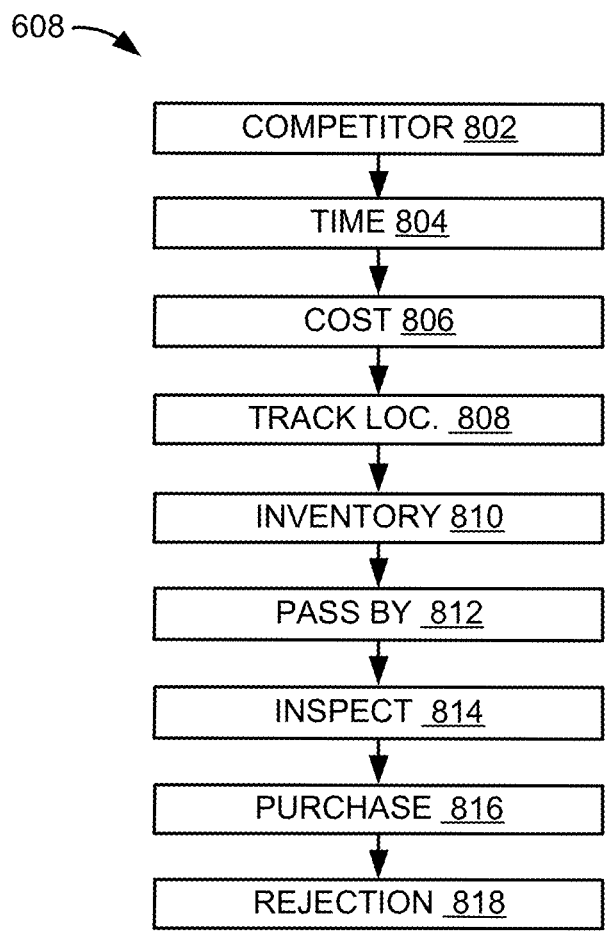
FIG. 8 is a control flow of the monitor module.

Referring now to FIG. 8, therein is shown a control flow of the monitor module 608. The monitor module 608 monitors consumer actions as the consumer travels to purchase the sale item 206 of FIG. 2. The monitor module 608 can also monitor the consumer during the errand route 216 of FIG. 2 to the sale location 208 of FIG. 2. The monitor module 608 also identifies the competitor's offer 308. The monitor module 608 can include a competitor module 802, a time module 804, a cost module 806, and a track location module 808.

The monitor module 608 can also include an inventory module 810, a pass by module 812, an inspect module 814, a purchase module 816, and a rejection module 818. Control flow can pass from one module to the next higher numbered module unless explicitly otherwise indicated.

The competitor module 802 identifies the competitor's offer 308 of FIG. 3 and the sale location 208 of the competitor's offer 308 of products that are similar to the sale item 206. The competitor module 802 can identify the competitor's offer 308 by searching for information through the internet or searching through the store inventory databases.

For example, the competitor module 802 can identify the competitor's offer 308 of milk from a different manufacturer that is next to the sale item 206 on the store shelf. The prices of all milk items on the shelf can be accessed from online inventory databases. Further, for example, each different brand of milk on the shelf can be equipped with the sensor node 302 of FIG. 3 for transmitting price information. The navigation system 100 can receive price information from the sensor node 302 or access the price information from online databases.

The time module 804 calculates the extra travel time 310 of FIG. 3 needed to travel from the consumer location 204 of FIG. 2 to the competitor's location 209 of FIG. 2 of the competitor's offer 308. The extra travel time 310 can be displayed on the display interface 202 of FIG. 3. The extra travel time 310 can help consumers decide if traveling to another store for the competitor's offer 308 is time efficient. The extra travel time 310 can be calculated by multiplying the average time it takes to travel by walk and drive in the area by the distance between the consumer location 204 and the competitor's location 209 of the competitor's offer 308.

The cost module 806 calculates the extra travel cost 312 of FIG. 3 needed to travel from the consumer location 204 to the competitor's location 209 of the competitor's offer 308. The extra travel cost 312 can be displayed on the display interface 202 of FIG. 3 to help consumers decide if traveling to another store or location for the competitor's offer 308 is cost efficient compared to the initial offer 210 in front of the consumer. The extra travel cost 312 can be calculated by multiplying the average cost of mileage by the distance between the consumer location 204 and the competitor's location 209.

The track location module 808 monitors the consumer during the errand route 216. The track location module 808 can identify the distance between the consumer and the sale item 206 for determining if the consumer's inspection 304 of FIG. 3 and the item rejection 306 of FIG. 3 has occurred. The track location module 808 can also monitor the consumer to see if the consumer has entered a geofence near the sale item 206.

The inventory module 810 identifies the low inventory 406 of FIG. 4 and the off-season period 408 of FIG. 4 for generating the second notification 215 of FIG. 2 of the supplemental incentive offer 212 of FIG. 2. The inventory module 810 can monitor the stock or reserves of the sale item 206 to identify the low inventory 406. The inventory module 810 can also receive the threshold amount for the low inventory 406.

For example, the total stock of "Brand A" milk in a store is fifty. The inventory module 810 can use the stock and inventory database of a store to monitor for the low inventory 406 of the sale item 206. The inventory module 810 can identify when the quantity of the sale item 206 has reached the low inventory 406 and request that the supplemental incentive offer 212 be displayed to consumers. The inventory module 810 can be used to clear out low quantities of the sale item 206 to make room for new inventory.

The inventory module 810 can also identify the date and time for the off-season period 408 of the sale item 206. The inventory module 810 can use calendar or time information to identify the off-season period 408 and request the generation of the second notification 215 of the supplemental incentive offer 212 for displaying to consumers. The inventory module 810 can also receives the dates and times for the off-season period 408.

The pass by module 812 identifies if the pass by 220 of FIG. 2 of the sale location 208 has occurred. For example, the seller can set the pass by 220 to be a half mile past the store's parking lot. Also, the navigation system 100 can be used to designate a geofence around the store's parking lot. If the consumer drives by the parking lot of the sale location 208 on the errand route 216 by half a mile, then the pass by 220 can be identified.

Further, for example, if the consumer walks twenty yards past the store entrance of the sale location 208, the pass by module 812 can identify the pass by 220. The pass by 220 of the sale location 208 on the errand route 216 usually indicates that the consumer has changed their mind about the initial offer 210. The navigation system 100 can generate the second notification 215 of the supplemental incentive offer 212 to the consumer to encourage the consumer to enter the store.

The inspect module 814 identifies the consumer's inspection 304 by the consumer of the sale item 206. The inspect module 814 can receive sensor information from the sensor node 302 for identifying the consumer's inspection 304. For example, if the sale item 206 is equipped with an accelerometer, the inspect module 814 can identify if the consumer picked up the sale item 206 to examine it.

Further for example, if the sale item 206 is a car, the inspect module 814 can identify how long the consumer has bent over to examine the interior of the car and if the consumer touched the car by identifying how closely the consumer is to the car using sensors. The store or dealership manager can also assign a small geofence around the car to identify the consumer's inspection 304 of the car.

The purchase module 816 identifies a likely purchase of the sale item 206. For example, the purchase module 816 can identify if the consumer places the sale item 206 in a shopping cart if the sale item 206 is equipped with sensors like an accelerometer. The navigation system 100 can also identify if the consumer picks up the sale item 206 and proceeds to the store cashier.

The rejection module 818 identifies the item rejection 306 of FIG. 3 after the consumer's inspection 304 of the sale item 206. The rejection module 818 can be identified after a predetermined distance away from the sale location 208. For example, in a supermarket, the item rejection 306 can be identified after twenty feet from the sale location 208 after the consumer's inspection 304. The navigation system 100 can use the rejection module 818 to identify the item rejection 306 and generate the second notification 215 of the supplemental incentive offer 212 to the consumer after the item rejection 306.

The physical transformation from monitoring the competitor's offer 308, the low inventory 406, the off-season period 408, the pass by 220, and the item rejection 306 results in movement in the physical world, such as people using the first device 102 based on the operation of the navigation system 100. The navigation system 100 can monitor the sale item 206 for the low inventory 406 and generate the supplemental incentive offer 212 to help clear out the inventory of the sale item 206.

The navigation system 100 can also monitor a consumer's response to the competitor's offer 308 and generate the supplemental incentive offer 212 to give the consumer an incentive to buy the sale item 206. The navigation system 100 can monitor the consumer's behavior in a store and identify the item rejection 306. As the movement in the physical world occurs, the movement itself creates additional information that is converted back to the supplemental incentive offer 212 for the continued operation of the navigation system 100 and to continue the movement in the physical world.

The modules of the monitor module 608 can be implemented on the first device 102 of FIG. 5, on the second device 106 of FIG. 6, or partitioned between the first device 102 and the second device 106. The first software 526 of FIG. 5 of the first device 102 of FIG. 5 can include the navigation system 100. For example, the first software 526 can include the competitor module 802, the time module 804, the cost module 806, the track location module 808, the inventory module 810, the pass by module 812, the inspect module 814, the purchase module 816, and the rejection module 818. The first control unit 512 of FIG. 5 can execute the first software 526.

The first control unit 512 can execute the competitor module 802 to identify the competitor's offer 308. The first control unit 512 can execute the time module 804 to calculate the extra travel time 310 from the consumer location 204 to the sale location 208 of the competitor's offer 308. The first control unit 512 can execute the cost module 806 to calculate the extra travel cost 312 from traveling the consumer location 204 to the sale location 208 of the competitor's offer 308.

The first control unit 512 can execute the track location module 808 to monitor the consumer during the errand route 216. The first control unit 512 can execute the inventory module 810 to identify the low inventory 406 and the off-season period 408 for generating the second notification 215 of the supplemental incentive offer 212. The first control unit 512 can execute the pass by module 812 to identify the pass by 220 of the sale location 208. The first control unit 512 can execute the inspect module 814 to identify the consumer's inspection 304 of the sale item 206.

The first control unit 512 can execute the purchase module 816 to identify if the consumer purchased the sale item 206. The first control unit 512 can execute the rejection module 818 to identify if the item rejection 306 has occurred after the consumer's inspection 304. The time module 804, the cost module 806, the track location module 808, the pass by module 812, and the rejection module 818 can use the first communication unit 516 of FIG. 5 to send and receive navigation information.

In an example for the second device 106 of FIG. 5, the second software 542 of FIG. 5 can include the monitor module 608. For example, the second software 542 can include the competitor module 802, the time module 804, the cost module 806, the track location module 808, the inventory module 810, the pass by module 812, the inspect module 814, the purchase module 816, and the rejection module 818. The second control unit 534 of FIG. 5 can execute the second software 542.

The second control unit 534 can execute the competitor module 802 to identify the competitor's offer 308. The second control unit 534 can execute the time module 804 to calculate the extra travel time 310 from the consumer location 204 to the sale location 208 of the competitor's offer 308. The second control unit 534 can execute the cost module 806 to calculate the extra travel cost 312 from traveling the consumer location 204 to the sale location 208 of the competitor's offer 308.

The second control unit 534 can execute the track location module 808 to monitor the consumer during the errand route 216. The second control unit 534 can execute the inventory module 810 to identify the low inventory 406 and the off-season period 408 for generating the second notification 215 of the supplemental incentive offer 212. The second control unit 534 can execute the pass by module 812 to identify the pass by 220 of the sale location 208. The second control unit 534 can execute the inspect module 814 to identify the consumer's inspection 304 of the sale item 206.

The second control unit 534 can execute the purchase module 816 to identify if the consumer purchased the sale item 206. The second control unit 534 can execute the rejection module 818 to identify if the item rejection 306 has occurred after the consumer's inspection 304. The time module 804, the cost module 806, the track location module 808, the pass by module 812, and the rejection module 818 can use the second communication unit 536 to send and receive navigation information.

In another example, the monitor module 608 can be partitioned between the first software 526 and the second software 542. For example, the first software 526 can include the competitor module 802. The second software 542 can include the competitor module 802, the time module 804, the cost module 806, the track location module 808, the inventory module 810, the pass by module 812, the inspect module 814, the purchase module 816, and the rejection module 818. The second control unit 534 can execute modules partitioned on the second software 542 and the first control unit 512 can execute modules partitioned on the first software 526.

The second control unit 534 can execute the competitor module 802 to identify the competitor's offer 308. The second control unit 534 can execute the time module 804 to calculate the extra travel time 310 from the consumer location 204 to the sale location 208 of the competitor's offer 308. The second control unit 534 can execute the cost module 806 to calculate the extra travel cost 312 from traveling the consumer location 204 to the sale location 208 of the competitor's offer 308.

The second control unit 534 can execute the track location module 808 to monitor the consumer during the errand route 216. The second control unit 534 can execute the inventory module 810 to identify the low inventory 406 and the off-season period 408 for generating the second notification 215 of the supplemental incentive offer 212. The second control unit 534 can execute the pass by module 812 to identify the pass by 220 of the sale location 208. The second control unit 534 can execute the inspect module 814 to identify the consumer's inspection 304 of the sale item 206.

The second control unit 534 can execute the purchase module 816 to identify if the consumer purchased the sale item 206. The second control unit 534 can execute the rejection module 818 to identify if the item rejection 306 has occurred after the consumer's inspection 304. The time module 804, the cost module 806, the track location module 808, the pass by module 812, and the rejection module 818 can use the second communication unit 536 of FIG. 5 to send and receive navigation information.

It has been discovered that the present invention provides the navigation system 100 with location-based supplemental incentive notification mechanism for conserving gasoline consumption and assisting consumers in planning errand trips for purchasing the sale item 206. The navigation system 100 can identify the extra travel time 310 and the extra travel cost 312 from the consumer location 204 to the sale location 208 of the competitor's offer 308. The extra travel time 310 and the extra travel cost 312 can inform the consumer if the travel costs associated with traveling to the sale location 208 of the competitor's offer 308 equals a lower price for the sale item 206.

It has also been discovered that the present invention provides the navigation system 100 with location-based supplemental incentive notification mechanism for delivering relevant and exclusive notifications to consumers. The navigation system 100 can identify consumer behavior and interest in the sale item 206 by identifying the pass by 220, the route change 222, the consumer's inspection 304, and the item rejection 306.

By identifying the pass by 220, the consumer's inspection 304, the route change 222, and the item rejection 306, the navigation system 100 can identify consumers that have shown an interest in the sale item 206 but are undecided or ambivalent to completing the purchase of the sale item 206. The navigation system 100 can generate the supplemental incentive offer 212 to give these types of consumers the extra incentive needed to purchase the sale item 206. The navigation system 100 avoids sending unwanted notifications to general consumers and only provides notifications of the supplemental incentive offer 212 to interested consumers that may need an extra incentive to purchase the sale item 206.

Thus, it has been discovered that the navigation system 100 of the present invention furnishes important and heretofore unknown and unavailable solutions, capabilities, and functional aspects for a navigation system for monitoring people and objects.

Figure 9:
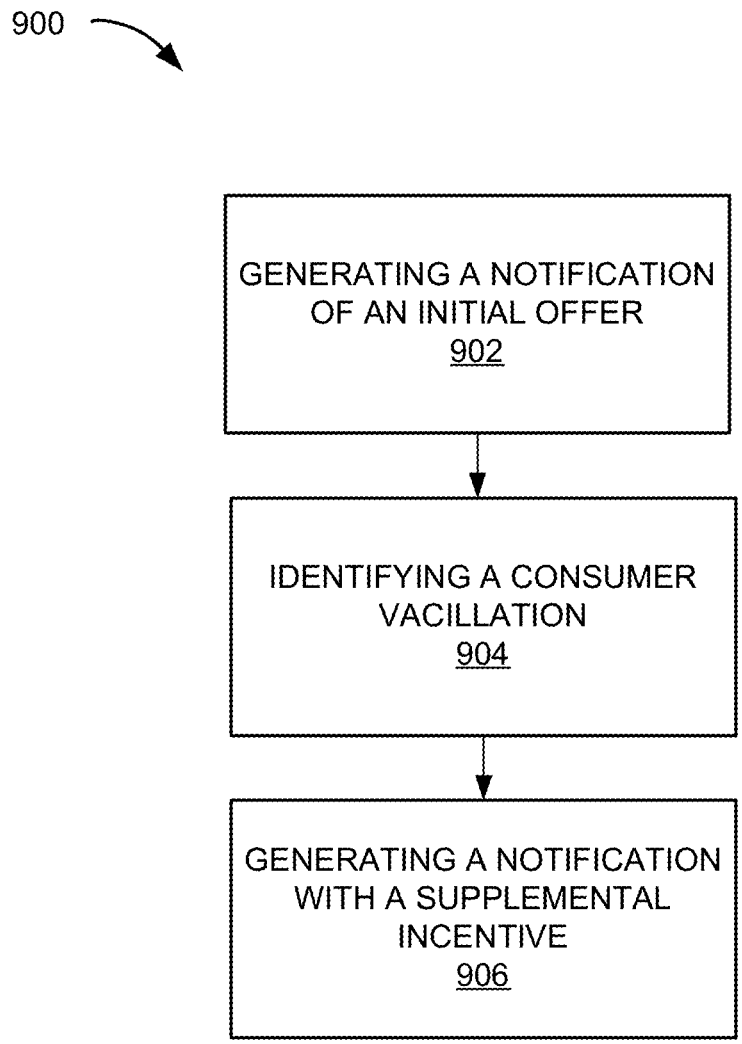
FIG. 9 is a flow chart of a method of operation of the navigation system in a further embodiment of the present invention.

Referring now to FIG. 9, therein is shown a flow chart of a method 900 of operation of the navigation system 100 in a further embodiment of the present invention. The method 900 includes: generating a notification of the initial offer in a block 902; identifying a consumer's vacillation to the initial offer in a block 904; and generating a second notification of the supplemental incentive offer based on the consumer's vacillation for displaying on a device in a block 906.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   generating, with a control unit, a notification of an initial offer;
   identifying a consumer's vacillation to the initial offer;
   generating a second notification of a supplemental incentive offer based on the consumer's vacillation for displaying on a device;
   identifying a competitor's offer near a sale location;
   calculating an extra travel time to a competitor's location of the competitor's offer;
   calculating an extra travel cost to the competitor's location of the competitor's offer; and
   generating a competitor notification of the extra travel time and the extra travel cost.

2. The method as claimed in claim 1 wherein identifying the consumer's vacillation to the initial offer includes:

identifying a consumer's inspection; and
identifying an item rejection to the initial offer subsequent to the consumer's inspection.

3. The method as claimed in claim 1 further comprising:
receiving a price-match limit for the supplemental incentive offer;
identifying a competitor's offer lower than the supplemental incentive offer; and
modifying the supplemental incentive offer to be lower than the competitor's offer not exceeding the price-match limit.

4. The method as claimed in claim 1 further comprising generating an errand route to a sale location of the initial offer.

5. A method of operation of a navigation system comprising:
generating, with a control unit, a notification of an initial offer, the initial offer having a sale location;
generating an errand route to the sale location;
identifying a consumer's vacillation to the initial offer;
generating a second notification of a supplemental incentive offer based on the consumer's vacillation for displaying on a device;
identifying a competitor's offer near the sale location;
calculating an extra travel time to a competitor's location of the competitor's offer;
calculating an extra travel cost to the competitor's location of the competitor's offer; and
generating a competitor notification of the extra travel time and the extra travel cost.

6. The method as claimed in claim 5 wherein identifying the consumer's vacillation to the initial offer includes identifying a route change to a competitor's location.

7. The method as claimed in claim 5 where identifying the consumer's vacillation to the initial offer includes identifying a pass by of the sale location.

8. The method as claimed in claim 5 further comprising:
identifying a low inventory; and
generating the second notification of the supplemental incentive offer based on the low inventory.

9. The method as claimed in claim 5 further comprising:
identifying an off-season period; and
generating the second notification of the supplemental incentive offer based on the off-season period.

10. A navigation system comprising:
a control unit:
executing an offer module for generating a notification of an initial offer;
executing a monitor module, coupled to the offer module, for identifying a consumer's vacillation to the initial offer;
executing an incentive module, coupled to the monitor module, for generating a second notification of a supplemental incentive offer based on the consumer's vacillation for displaying on a device;
executing a competitor module, coupled to the offer module, for identifying a competitor's offer near a sale location;
executing a time module, coupled to the competitor module, for calculating an extra travel time to a competitor's location of the competitor's offer;
executing a cost module, coupled to the time module, for calculating an extra travel cost to the competitor's location of the competitor's offer; and
executing an alternative module, coupled to the cost module, for generating a competitor notification of the extra travel time and the extra travel cost.

11. The system as claimed in claim 10 wherein the monitor module includes:
an inspect module, coupled to the offer module, for identifying a consumer's inspection; and
a rejection module, coupled to the inspect module, for identifying an item rejection to the initial offer subsequent to the consumer's inspection.

12. The system as claimed in claim 10 wherein the control unit is for:
receiving a price-match limit for the supplemental incentive offer;
identifying a competitor's offer lower than the supplemental incentive offer; and
modifying the supplemental incentive offer to be lower than the competitor's offer not exceeding the price-match limit.

13. The method as claimed in claim 10 wherein the control unit is for generating an errand route to a sale location of the initial offer.

14. The system as claimed in claim 10 wherein the control unit is for:
generating a notification of an initial offer, the initial offer having a sale location; and
generating an errand route to the sale location.

15. The system as claimed in claim 14 wherein the monitor module is identifying the consumer's vacillation to the initial offer includes identifying a route change to a competitor's location.

16. The system as claimed in claim 14 wherein the monitor module is for identifying the consumer's vacillation to the initial offer includes identifying a pass by of the sale location.

17. The system as claimed in claim 14 wherein the control unit is for:
identifying a low inventory; and
generating the second notification of the supplemental incentive offer based on the low inventory.

18. The system as claimed in claim 14 wherein the control unit is for:
identifying an off-season period; and
generating the second notification of the supplemental incentive offer based on the off-season period.

* * * * *